United States Patent
Carlisle et al.

(10) Patent No.: US 10,252,420 B2
(45) Date of Patent: *Apr. 9, 2019

(54) COLLABORATIVE ROBOT

(71) Applicant: Precise Automation, Inc., Fremont, CA (US)

(72) Inventors: Brian Carlisle, Los Altos, CA (US); Bruce Shimano, Hacienda Heights, CA (US)

(73) Assignee: Precise Automation, Inc., Fremont, CA (US)

( * ) Notice: Subject to any disclaimer, the term of this patent is extended or adjusted under 35 U.S.C. 154(b) by 126 days.

This patent is subject to a terminal disclaimer.

(21) Appl. No.: 15/618,525

(22) Filed: Jun. 9, 2017

(65) Prior Publication Data

US 2018/0354135 A1    Dec. 13, 2018

(51) Int. Cl.
| | |
|---|---|
| *B25J 9/16* | (2006.01) |
| *B25J 9/04* | (2006.01) |
| *B25J 13/08* | (2006.01) |
| *B25J 9/10* | (2006.01) |
| *B25J 9/12* | (2006.01) |

(52) U.S. Cl.
CPC .......... *B25J 9/1676* (2013.01); *B25J 9/042* (2013.01); *B25J 9/104* (2013.01); *B25J 9/12* (2013.01); *B25J 13/085* (2013.01); *G05B 2219/40201* (2013.01); *G05B 2219/40202* (2013.01)

(58) Field of Classification Search
CPC ... B25J 9/1676; B25J 9/104; B25J 9/12; B25J 13/085; G05B 2219/40202; G05B 2219/40201

USPC ................................................ 700/245, 255
See application file for complete search history.

(56) References Cited

U.S. PATENT DOCUMENTS

| | | |
|---|---|---|
| 1,966,471 A | 7/1934 | Walters |
| 4,507,044 A | 3/1985 | Hutchins et al. |
| 4,547,847 A | 10/1985 | Olig et al. |
| RE32,414 E | 5/1987 | Hutchins et al. |
| 4,690,010 A | 9/1987 | Matsumoto et al. |
| 4,702,668 A | 10/1987 | Carlisle et al. |

(Continued)

FOREIGN PATENT DOCUMENTS

| | | |
|---|---|---|
| GB | 2 481 249 A | 12/2011 |
| JP | H01-177990 A | 7/1989 |

OTHER PUBLICATIONS

International Search Report and Written Opinion for International Application No. PCT/US2018/036669, dated Sep. 25, 2018.

*Primary Examiner* — Jaime Figueroa
(74) *Attorney, Agent, or Firm* — Wolf, Greenfield & Sacks, P.C.

(57) ABSTRACT

A collaborative robot employs low ratio drives for three or more axes of movement, such as three primary axes. An arm assembly may be mounted to a support for movement along a vertical linear axis, and the arm assembly may include first and second arm links that are each rotatable about vertical axes, e.g., such that the arm links move in a horizontal plane. Low ratio drives may be used for movement along the vertical linear axis and the rotary axes for the first and second arm links. Feedforward and feedback control may be employed to control the movement of the arm assembly and arm links, and feedback torque components may be limited to 25% or less of the maximum drive torque.

20 Claims, 7 Drawing Sheets

(56) References Cited

U.S. PATENT DOCUMENTS

| | | |
|---|---|---|
| 4,761,973 A | 8/1988 | Gangi |
| 5,119,006 A | 6/1992 | Torii et al. |
| 5,131,364 A | 7/1992 | Mann |
| 5,155,423 A * | 10/1992 | Karlen ............... B25J 9/04 318/568.1 |
| 5,214,749 A | 5/1993 | Brown |
| 5,379,367 A | 1/1995 | Song |
| 5,415,417 A | 5/1995 | Reis, Jr. |
| 5,782,133 A | 7/1998 | Kullborg |
| 5,955,687 A | 9/1999 | Miyagi et al. |
| 5,994,864 A | 11/1999 | Inoue et al. |
| 6,068,442 A | 5/2000 | Flemmer et al. |
| 6,293,750 B1 | 9/2001 | Cohen et al. |
| 6,428,266 B1 | 8/2002 | Solomon et al. |
| 7,102,315 B2 | 9/2006 | Nakata et al. |
| 7,422,412 B2 | 9/2008 | Akaha |
| 8,571,712 B2 | 10/2013 | Miyauchi et al. |
| 8,655,429 B2 | 2/2014 | Kuduvalli et al. |
| 9,096,281 B1 | 8/2015 | Li et al. |
| 9,555,546 B2 * | 1/2017 | Hamm ............... B25J 9/1643 |
| 9,615,712 B2 | 4/2017 | Dooley et al. |
| 9,796,495 B2 | 10/2017 | Boden et al. |
| 10,029,369 B1 | 7/2018 | Carlisle et al. |
| 2001/0011879 A1 | 8/2001 | Erdman |
| 2001/0030482 A1 | 10/2001 | Ley |
| 2002/0078778 A1 | 6/2002 | Grover et al. |
| 2002/0098072 A1 | 7/2002 | Sundar |
| 2004/0001750 A1 * | 1/2004 | Kremerman ............... B25J 9/042 414/744.1 |
| 2006/0216137 A1 | 9/2006 | Sakata et al. |
| 2007/0110555 A1 | 5/2007 | Ono |
| 2008/0001735 A1 * | 1/2008 | Tran ............... G06F 19/3418 340/539.22 |
| 2010/0249800 A1 | 9/2010 | Kim et al. |
| 2011/0072918 A1 | 3/2011 | Reekers |
| 2011/0130876 A1 * | 6/2011 | Gao ............... B25J 9/1633 700/258 |
| 2011/0153062 A1 | 6/2011 | Hong et al. |
| 2012/0215356 A1 | 8/2012 | Igarashi et al. |
| 2012/0291635 A1 | 11/2012 | Ito et al. |
| 2013/0047772 A1 | 2/2013 | Shafer et al. |
| 2013/0090194 A1 * | 4/2013 | Ferlay ............... B25J 9/104 474/64 |
| 2013/0110128 A1 | 5/2013 | Schostek et al. |
| 2013/0116821 A1 * | 5/2013 | Joly ............... B25J 9/161 700/254 |
| 2013/0257238 A1 | 10/2013 | Herron et al. |
| 2013/0305866 A1 * | 11/2013 | Krumbacher ............... B25J 18/06 74/490.03 |
| 2013/0325034 A1 * | 12/2013 | Schena ............... A61B 34/30 606/130 |
| 2014/0090507 A1 | 4/2014 | Imai et al. |
| 2014/0123605 A1 | 5/2014 | Cere' et al. |
| 2014/0135984 A1 * | 5/2014 | Hirata ............... B25J 9/1676 700/255 |
| 2014/0244039 A1 | 8/2014 | Smith |
| 2014/0348618 A1 | 11/2014 | Blank |
| 2015/0135880 A1 | 5/2015 | Zaruba et al. |
| 2015/0234375 A1 * | 8/2015 | Takayama ............... G05B 19/4086 700/187 |
| 2015/0246740 A1 | 9/2015 | Boden et al. |
| 2016/0114480 A1 * | 4/2016 | Krumbacher ............... B25J 9/046 74/490.03 |
| 2016/0136819 A1 * | 5/2016 | Kitahara ............... B65G 47/90 414/749.1 |
| 2016/0136964 A1 | 5/2016 | Howarth et al. |
| 2017/0108098 A1 * | 4/2017 | Abdallah ............... B25J 17/00 |
| 2017/0282356 A1 | 10/2017 | Nagatsuka |

* cited by examiner

COLLABORATIVE ROBOT

BACKGROUND

Until recently all industrial robots installed in factories were separated from people by safety barriers and interlocks to prevent the robots from colliding with a human and possibly causing injury. Large robots can carry payloads of hundreds of kilograms and are therefore potentially very dangerous due to the masses involved. However, even small assembly robots, which often operate at high tool speeds of 7-10 meters per second, have enough energy to seriously injure humans though their payloads are typically 3 kg or less.

Recently there has been growing interest in allowing robots to work safely next to people in the same working volume without the need for expensive and cumbersome safety screens. This class of robots is referred to in the industry as "Collaborative Robots."

In 2016, an ISO standard ISO_TS 15066 2016 "Robots and Robotic Devices—Collaborative Robots," was published listing safe levels for collision forces that would not cause injury to people. Collision force is determined by the robot's and the payload's kinetic energy, the stopping distance and commanded motor torque. The stopping distance is determined by the kinetic energy, the compliance (stiffness) of the part of the human body that is struck, the compliance of the robot structure that strikes the person, and whether the collision occurs in free space or traps a part of the body against a rigid surface. The safe stopping distance can typically vary from a few millimeters to a few centimeters, depending on these factors. In order to comply with this standard, many robots users have had to dramatically slow down their operating speed if there was any chance the robot could collide with a human.

Various efforts have been made to reduce collision forces by means of sensors. For example, laser zone sensors have been used to detect if a person is entering a specified zone and to subsequently slow down or stop a robot. However, these are quite expensive, typically costing thousands of dollars, and for small robots are difficult to justify when compared to a safety barrier. Also, even if a collision does not occur, this approach negatively impacts the robot's cycle time and productivity whenever a person works close to the robot, which is the real goal and benefit of collaborative robots.

Touch and force or torque sensors can be added to the robot, but these typically only affect the tool tip or part of the robot, and require a collision before the control system can react and attempt to slow the robot. Consequently, to allow for an adequate reaction time, the robot must be operated at a slower, less productive speed virtually all of the time. These sensors also add cost, and if depended on for safety must be made redundant or fail-safe.

Work is ongoing in evaluating capacitive distance sensors in an attempt to sense a human electrical field from a great enough distance to slow down a robot. This work has not been proven safe as clothing and metal objects can interfere with this type of sensing. Also, like laser zone sensors, the robot and work cell cycle time are adversely affected even if a human is in the vicinity of the robot, but no collision occurs.

SUMMARY OF INVENTION

In accordance with an aspect of the invention, a robot is provided that may operate around humans, e.g., the robot may be configured to operate alongside human beings according to ISO_TS 15066 2016 regulations, while achieving higher speeds than other collaborative approaches. In one arrangement, the robot may include four or more degrees of freedom, e.g., the robot may include multiple links or other components that are joined together such that each link can pivot or otherwise move in relation to a respective axis relative to the link or other component to which the link is joined. Movement of links or other robot components relative to at least three of the axes (or degrees of freedom) may be driven by a motor and drive train that has a low drive ratio, e.g., having a ratio of 25:1 or less, and/or may be back-drivable (i.e., the rotor of the drive motor may be rotated or otherwise moved by exerting force on the driven robot link or other part). In some cases, employing a drive ratio of less than 10:1 for at least three axes, and particularly for at least three major axes of the robot, may provide particular advantages.

In one embodiment, the robot may have a base that is fixed relative to ground or another structure, and an arm assembly may be movable relative to the base along an arm assembly axis. In one example, the arm assembly may be movable along a vertical direction relative to the base, and may be cantilevered relative to the base. The arm assembly may include a first link that is pivotable about a first axis relative to the base, and a second link that is pivotable about a second axis relative to the first link. Movement of the arm assembly, the first link and the second link in relation to their respective axes may be driven by a motor and drive train that has a low drive ratio of 25:1 or less and/or that is back-drivable. (In the case of a drive ratio of 1:1, the drive train may be very simple and include a connection of a motor shaft to the respective part, such as a direct connection of a drive motor shaft to the first link. However, other drive train arrangements are possible that have a drive ratio of 1:1 and yet include multiple components.) By employing a low drive ratio of 25:1 or less for three axes or degrees of freedom, the robot may have significantly reduced reflected inertia, and thus reduced effective mass, as compared to robotic structures that employ higher ratio drive trains. This may enable the collaborative robot to operate safely at higher speeds in the presence of humans than would otherwise be possible.

In some embodiments, the three degrees of freedom of the robot that employ low ratio drive trains for movement may be the major or "first" three degrees of freedom of the robot. The "first" three degrees of freedom (or movement axes) in this case are determined as the three degrees of freedom physically or functionally nearest the robot base. These "first" three degrees of freedom may have the greatest impact or influence on the speed and distance of movement of the robot end effector or other end portion of the robot since they are often furthest from the end effector and these degrees of freedom typically provide the greatest torque since they need to accelerate the largest inertias. Thus, providing low ratio drive trains with their reduced reflected inertias for the "first" three degrees of freedom (or movement axes) may have the greatest influence in terms of reducing potential collision forces. Of course, low ratio drive trains may be used for other degrees of freedom that are "further" from the robot base.

In some embodiments, a robot having low ratio drive trains for at least three degrees of freedom may employ a dynamic feedforward control by which feedforward torques are determined in real time and are combined with, e.g., added to, feedback error torques to generate control signals for the drives for each of the at least three degrees of freedom. As is explained in more detail below, the feedforward torques may be determined to account for acceleration or velocity of a corresponding link or other component, and gravitational or frictional force on the link movement, so that feedback error torques can be reduced. Reducing feedback error torques used to determine drive control signals can significantly reduce impact forces during a collision of the robot with a human or other object, and so the robot may be operated at yet higher speeds. In some embodiments, feedback error torques may be limited as a fraction, e.g., 10 to 25%, of a peak motor torque that a drive train may exert on a link or other robot driven component.

In one embodiment, a robot may include a base with a vertical support extending from the base, and an arm assembly supported by the vertical support that is moveable relative to the vertical support along a vertical axis. In some cases, the arm assembly may be cantilevered from the vertical support, and have two or more links that are movable about vertical axes. That is, the two or more links may be movable in a horizontal plane, which may reduce the effect of gravitational forces on the movement of the links. An arm assembly drive may be arranged to move the arm assembly relative to the vertical support along the vertical axis, and the arm assembly drive may include a motor and drive train with a drive ratio of less than 25:1 and/or may be back-drivable. The arm assembly may include a first arm link coupled to the vertical support and arranged to rotate relative to the base about a first axis that is oriented in a vertical direction. The first axis may be co-axial with the vertical axis along which the arm assembly is movable, or may be spaced from, and parallel to, the vertical axis. A first link drive may include a motor and drive train that moves the first arm link relative to the base with a drive ratio of less than 25:1 and/or may be back-drivable. The arm assembly may also include a second arm link coupled to the first arm link and that is arranged to rotate relative to the first arm about a second axis oriented in the vertical direction. As an example, a distal end of the first arm link may be coupled to a proximal end of the second link. A second link drive may include a motor and drive train that moves the second arm link relative to the first arm link with a drive ratio of less than 25:1 and/or may be back-drivable. As noted above, the relatively low drive ratios and/or back-drive capability of the arm assembly drive, and the first and second link drives may provide the robot with a significantly reduced reflected inertia as compared to robots employing higher drive ratios for these components. A third link may be coupled to the second arm link, e.g., at a distal end of the second arm link, and arranged to rotate or otherwise move relative to the second arm link about a third axis. Movement of the third link may be driven by a motor or other means, and a drive ratio used for the third link may be any suitable ratio, although a low ratio used for other components may be preferable in some arrangements. A controller may provide control signals to the arm assembly drive and to the first and second link drives to move the arm assembly, the first arm link and the second arm link, respectively.

In some embodiments, the vertical support may be arranged to pivot relative to the base about the first axis, and the first link drive may be arranged to pivot the vertical support relative to the base about the first axis, and thereby move the first link relative to the base about the first axis. Thus, the first arm link may be fixed relative to the vertical support with respect to pivotal movement about the first axis, and instead may pivot with the vertical support about the first axis. Although the first arm link may be fixed relative to the vertical support with respect to rotation about the first axis, the first arm link may be moveable relative to the vertical support along the vertical axis, along with the rest of the arm assembly. In another embodiment, the arm assembly includes a carriage that is attached to the vertical support and is arranged to move relative to the vertical support along the vertical axis. The arm assembly drive may be arranged to move the carriage relative to the vertical support along the vertical axis, and the first arm link may be pivotally attached to the carriage and arranged to pivot relative to the carriage about the first axis or an axis parallel to the first axis. Thus, in this arrangement the first link drive may be arranged to move the first arm link relative to the carriage about the first axis or an axis parallel to the first axis, and thereby move the first arm link relative to the base.

The arm assembly drive and the first and second link drives may be arranged in different ways to provide a low drive ratio. For example, the motors of the first and second link drives may be directly connected to the first and second arm links, respectively, to provide a 1:1 drive ratio. In other embodiments, a 1:1 or other low drive ratio may be provided with some sort of transmission between the motor and driven part, such as a belt drive between the drive motor and the respective moved part. In some cases, the first and/or second link drive motor could be located coaxially with the first or second axis (e.g., so a motor rotor rotates about the first or second axis), or could be located more remotely, such as within or otherwise on the vertical support and a drive belt or other transmission may deliver the driving force to the first or second link arm. Providing the drive motor away from the first or second axis may reduce inertia of the first and/or second links by positioning the motor mass closer to, or completely isolated from, a movement axis.

As noted above, a robot having low ratio drive arrangements for at least three degrees of freedom may be controlled using control signals for the drive motors that include feedforward and feedback torque components. In one embodiment, control signals provided by the controller to the arm assembly drive and to the first and second link drives includes a feedforward torque component, e.g., that may be determined in real time and based on acceleration, gravity, velocity and/or friction components regarding the robot part to be moved. The control signals may also include a feedback torque component that may be limited to 10% to 25% of the maximum motor torque for the motor receiving the control signal.

As will be appreciated from the above, in at least some embodiments, the potential collision force of a robot may be reduced by a combination of reducing the forward reflected inertia of the motors and drive train for at least some joints and reducing the motor torques that contribute to the collision force. As described above, forward reflected inertia can be reduced by employing low ratio drives for at least three movement axes. The contributing motor torques may be decreased by computing in real-time the theoretical dynamic feedforward motor torques necessary to drive the robot components, e.g., links associated with at least three degrees of freedom of the robot. The robot controller may differentiate between the feedforward torque components of a control signal and feedback torque components of the control signal, such as proportional-integral-derivative (PID) feedback error torques (e.g., which may include position error torque, integral error torque, derivative error torque, and acceleration error torque), that correct for deviations during normal operation and collisions (also referred to as the feedback). When the feedforward torques are properly determined, the normal operating feedback torques can be a relatively small percentage of the total available or maximum motor torque of motors being controlled, and the feedback torques can be limited to significantly reduce the motor torques generated during a collision. In at least some embodiments, drive control according to this aspect of the invention differs from other techniques in that collision force limiting is effective at all times during robot movement and control and does not require detecting a collision and switching control modes to become effective. Further, as will be explained more below, it is possible to limit the motor torque in a collision to a small percentage of the total available or maximum motor torque, for example to be 25% or less of the maximum motor torque, thus further reducing collision forces. This may avoid, for example, control signals that cause motor current and torque overshoot during a collision.

Another feature of at least some embodiments is that the safe operating speed of a robot can be increased when working in a "Collaborative Mode" where the robot may potentially collide with a person, so that any such collision does not exceed a specified safe collision force. This higher operating speed in and of itself may result in faster work cell cycle times and greater productivity, but compares even more favorably to methods that require that the robot be slowed down when a person enters into the working volume of the robot or is in close proximity to any portion of the robot.

In at least some embodiments, a robot controller uses a feedforward control algorithm that solves a complete dynamic model of the robot in real time (for example in less than 1 millisecond) to continuously compute the motor torques necessary to theoretically drive the robot, or at least to control motor drives associated with three or more degrees of freedom of the robot. This model includes all the coupled torques between axes, including coupled acceleration forces, centripetal acceleration forces, Coriolis forces, gravity forces, friction forces, and actuator non-linearities, and thus incorporates torque components for all of these features as necessary. The accuracy of this model depends on the smoothness and dynamic repeatability of the mechanical device. In theory, if the robot was dynamically perfect and the model was perfect, the robot could be driven by only feedforward with no feedback and would exactly follow the commanded motions. For robots with direct-drive or low ratio drives, as an example, the accuracy of the model can exceed 90% in predicting the torque necessary to drive the complete range of robot motions. However, for robots with high-friction harmonic-drive speed reducers (which inherently have a high drive ratio), a 30% variation in friction of the harmonic-drives from robot to robot reduces the accuracy to about 60% over a sample of robots. Therefore, in addition to reducing forward-reflected motor inertias, there is a significant advantage in at least some embodiments of this invention in using a direct-drive or low ratio drives with both low and repeatable joint friction.

In at least some embodiments, in addition to the feedforward torques, the controller may determine feedback torques to correct for deviations between the dynamic feedforward model and actual movement of the controlled robot parts, and include feedback torque components in control signals provided to robot link drives. The controller may determine the feedback torques utilizing an enhanced classical PID structure, which measures position, velocity and acceleration errors and multiplies these errors by gains and combines them with other corrections. The determined feedforward torques and the feedback torque components may be added together to provide the total motor torque command or control signal.

When employed with low drive ratio actuators and during standard (non-collision) operation, the feedback error torques can be as low as 10% of the total available or maximum motor torque. It is therefore possible to set a low limit on the PID feedback error torques, for example the feedback torque component of a control signal may be limited to be 10% to 25% of the total available or maximum motor torque, which effectively limits the motor torque contribution during both low speed and high-speed collisions. As soon as this feedback error torque limit is reached, the torque output is limited accordingly, the position error begins to increase, a position tracking error is generated and the robot decelerates quickly to a safe stop with the maximum motor error torque limited to the 10% to 25% of its peak, providing a very large reduction in low-speed or quasi-static collision force.

These and other aspects of the invention will be understood from the following detailed description.

DETAILED DESCRIPTION

It should be understood that aspects of the invention are described herein with reference to certain illustrative embodiments and the figures. The illustrative embodiments described herein are not necessarily intended to show all aspects, but rather are used to describe a few illustrative embodiments. Thus, aspects are not intended to be construed narrowly in view of the illustrative embodiments. In addition, it should be understood that certain features disclosed herein might be used alone or in any suitable combination with other features.

The safe operating speed for a collaborative robot is determined by the kinetic energy of the moving mass (which is equal to $\frac{1}{2} mv^2$), the motor torque applied during the collision, the compliance (stiffness) of the robot and the region of the person where the robot strikes. The moving mass is composed of the robot payload, the robot structure, and an equivalent mass that represents the forward reflected inertias of the motor rotors and high-speed portion of their drive transmissions measured at the robot gripper or other robot portion that may potentially strike a human. The equivalent mass for the forward reflected inertia about an axis is equal to the sum of the inertias of the motor rotors and the high-speed portion of their transmissions each multiplied by the square of their reduction ratios and divided by the square of the distance from the axis of rotation. For robots with high gear reductions, this equivalent mass can be quite large even though the rotor and transmission masses are relatively small.

Collisions of a robot with a human or other object can be separated into high-speed collisions and low-speed, or quasi-static collisions. For high-speed collisions, the forces due to stopping the kinetic energy of the moving robot are dominant. However, the motor torques commanded by the control system to move the robot can also be important, since conventional robot controllers typically command the maximum motor torques when a collision occurs, causing the robot to drive into a person in an attempt to correct the position and speed errors caused by the collision. For low-speed and quasi-static collisions, the forces due to the control system commanding maximum torque from the motors to correct for position and velocity errors are dominant. When a collision occurs, the drive ratios are also a factor in the collision force, because a component of the collision force will be equal to the commanded motor torque times the drive ratio divided by the moment arm. So, for a given collision force, a lower drive ratio employed at movement axes of the robot results in a higher motor reaction force and improves the ability of a controller to detect a collision.

Various efforts have also been made to reduce the collision forces of robots with gear trains by adjusting how drive motors are controlled. For example, Inoue in U.S. Pat. No. 5,994,864 discloses a compliance control apparatus that can switch between position control and compliance control in which motor torques are limited to control the force the robot can apply to an object in a desired coordinate system. Inoue addressed low speed applications where a robot is pressing on a surface, for example in grinding, and the exact location of the surface is not known. The robot must approach the surface, then switch to compliance mode when it contacts the surface. During this transition, the integrator portion of the drive control must be turned off in order to avoid building up high forces due to integrating position error. In order to avoid sagging during the transition to compliance mode, Inoue stores the integrator value as a torque offset before adding the torque values for the particular axis to command the desired forces in the desired direction. This approach helps with low speed collisions where a certain force is desired, but does not limit higher speed collision forces as it takes time for the control system to recognize a collision and switch control modes and at higher speeds large forces can build up during recognition of the collision. Inoue does not disclose a low ratio or direct-drive transmission or possible robot kinematic configurations as means to reduce the collision forces from reflected inertias and has a very limited approach to controlling the contact forces due to motor torque.

Nakata et al in U.S. Pat. No. 7,102,315 disclose a control system where, in the event of a collision, deviations from a commanded angular velocity cause the control system to reverse the torque commanded to the motor until the velocity drops to a predetermined level at which point the control system is switched to a fixed torque or "compliance control." This helps unwind the stress in the gear train during a collision. However, this is done at the time of collision on a joint by joint basis and does not take into account reflected torques from other axes in limiting the maximum torques that are allowed to be applied in the event of collisions. Again, while Nakata argues that the time for the control system to respond is reduced using this approach, there is still a delay before the control system responds. In addition, Nakata does not disclose a low ratio or direct-drive transmission or possible robot kinematic configurations as means to reduce the collision forces from reflected inertias and high initial contact forces due to motor torques can still occur especially for high speed motions.

Torii et al in U.S. Pat. No. 5,119,006 disclose a control system in which the controller monitors a periodically updated change in velocity value and checks this change against a predetermined value to detect a collision, at which point the current command is set to zero. This approach does not limit the reflected inertia or the current applied at the time of collision and retains the time lag in the control loop before any action occurs.

Figure 1:
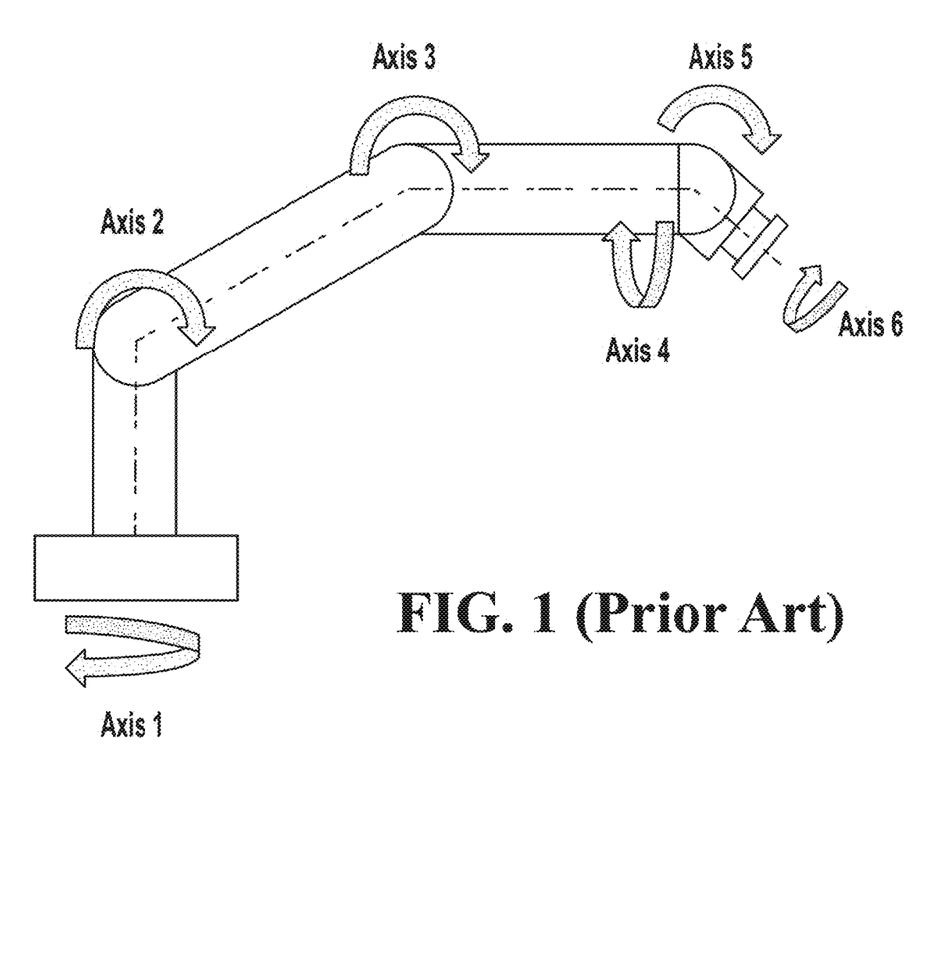
FIG. 1 shows a typical vertically articulated 6-axis robot.

Almost all 6-axis robots in the market at the time of this submission have the geometric ("kinematic") structure shown in FIG. 1, which means that Axes 2, 3, 4, and 5 are typically subjected to a large moment arm and torque due to gravity. For example, a 1 Nm motor used with a typical 6-axis rotary link having a length or radius of movement of 1 m can only support 1N. For this reason, 6-axis robots with revolute kinematics like that in FIG. 1 typically have very high gear or drive ratios in order to support the high gravity loads while still permitting use of compact motors. However, these high gear ratios also result in very large forward reflected inertias and high kinetic energies and high collision forces, which negatively impact the collaborative nature of these robots.

For example, in the case of a typical small 6-axis robot with a payload capacity of 3 kg and the configuration shown in FIG. 1, the motor drive ratio is 160:1 for Axis 2. The motor rotor inertia is $0.18 \times 10^{-4}$ kg-m$^2$, and the high-speed portion of the harmonic drive transmission has an inertia of $0.28 \times 10^{-4}$ kg-m$^2$. When these inertias are multiplied by the square of 160 (to obtain the reflected inertia as discussed above), the resulting reflected inertia is 1.2 kg-m$^2$. The equivalent mass for this reflected inertia, taken at the 400 mm radius of the gripper is 7.5 kg. For this same robot, the reflected inertia for Axis 3 with a 120:1 motor drive ratio is 2.52 kg at a 300 mm radius, and for Axis 5 with a 101:1 motor drive ratio it is 9.1 kg at a 100 mm radius. Adding up these reflected inertias yields a total equivalent inertial mass at the robot gripper of 19.1 kg or 6.3 times the 3 kg payload capacity. (The gravity load for the links of this example robot at a 400 mm radius is 6 kg, giving a total effective mass at the gripper for inertia plus mass of 25.1 kg, without payload). For a given kinetic energy of $\frac{1}{2}$ mv$^2$, if this reflected inertia could be eliminated, the velocity could be increased by the square root of 6.3, or a factor of 250%, and allow for safe operation around people.

From the above it can be seen that it is desirable to reduce the reflected inertias and reduction or drive ratios in the mechanical design of the robot and to reduce the motor torques commanded in the event of a collision.

In accordance with at least some embodiments, the operating speed of a "collaborative" robot can be significantly increased while maintaining safe collision forces with a human by means of a novel combination of mechanical design and control system design. In some arrangements, a control algorithm which dramatically limits motor torques in a collision combined with low drive ratio transmissions for the major axes of the robot and a robot geometry that reduces the required motor drive ratios can allow more than a 100% increase in operating speed for a specified safe collision force when compared to the existing art.

Some embodiments combine a 4, 5 or 6-axis robot geometric structure with low-ratio drives (less than 25:1 drive ratio) or direct-drives (1:1 drive ratio) for the major rotary axes, which dramatically lowers the forward-reflected motor inertias, with a control algorithm that limits motor torque in a collision to a small fraction of available motor torque. This novel combination reduces both low speed and high-speed collision forces and significantly increases the safe operating speed for this new type of robot when there is a possibility it may collide with humans. This higher safe operating speed permits this robot to perform operations at the same or somewhat faster speeds than people while safely working side by side with other personnel, and therefore increases its financial benefit.

Figure 2:
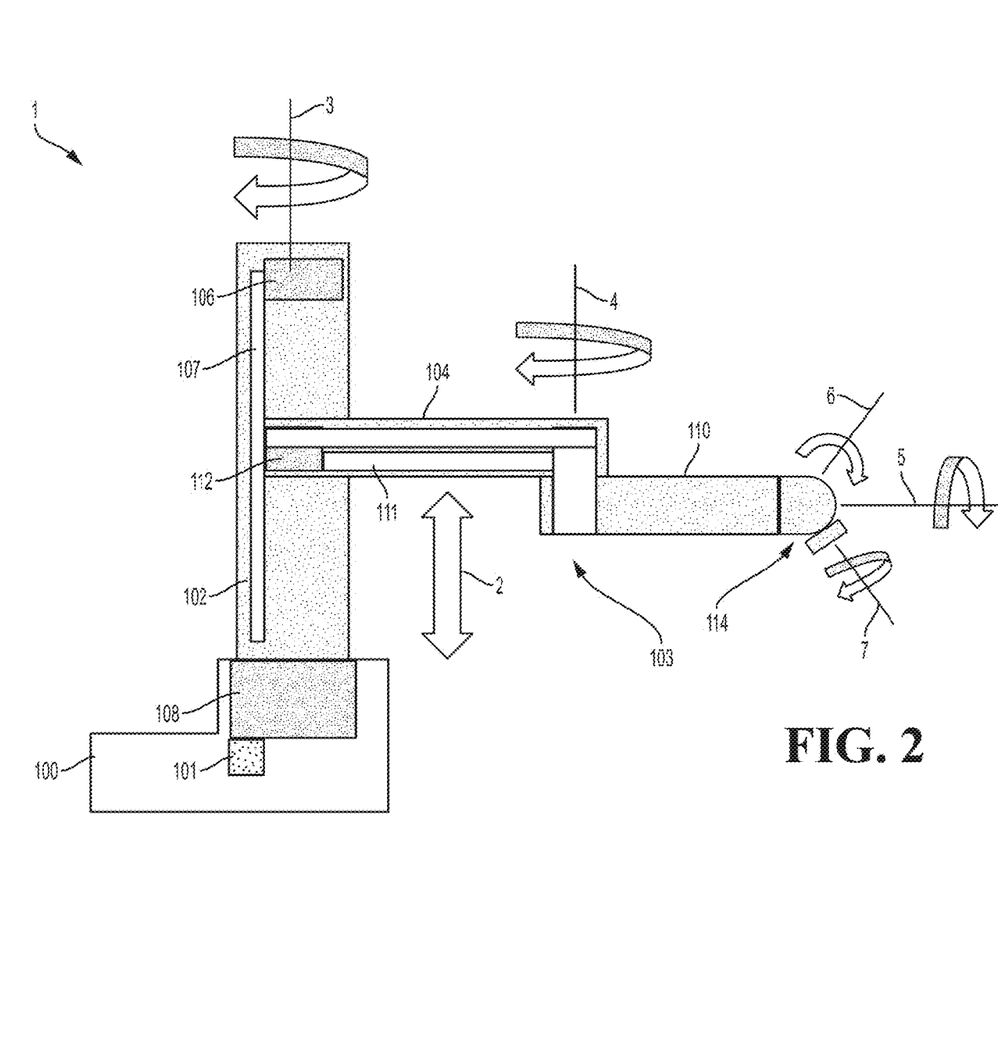
FIG. 2 shows an illustrative embodiment of a horizontally articulated 6-axis robot having a first arm link attached to a vertical support, which support pivots about a vertical axis.

In one embodiment that incorporates aspects of the invention discussed above, a kinematic configuration incorporating a vertical linear axis like that shown in FIG. 2 has several advantages over the configuration in FIG. 1. First, the robot portions that pivot about the major rotary axes (the first and second rotational axes 3, 4) move in the horizontal plane, thus eliminating the gravity load on these rotary axes. The gravity load is instead placed on the vertical axis, which can be counterbalanced if desired, and in any case, the moment load on the vertical axis drive is greatly reduced, allowing the use of a much lower drive ratio. For example, a 5:1 or 10:1 drive ratio can be used instead of 160:1 as is needed in the primary gravity loaded axis 2 of the configuration in FIG. 1. This greatly reduces the reflected drive inertia in the vertical direction. Also, since the major rotary axes move in the horizontal plane and are not gravity loaded, they can be driven by low-ratio or direct-drive transmissions, dramatically reducing collision forces in the horizontal plane due to much lower forward reflected inertias.

As an example, for the 6-axis robot described earlier (FIG. 1) with a nominal payload of 3 kg, the total effective mass of the robot at the tool, which includes all reflected inertias and the mass of the links and the payload, is 25 kg. This can be reduced to about 6 kg or by a factor of 4.2 by employing aspects of the invention, e.g., the configuration of FIG. 2. This dramatically reduces the collision forces due to the kinetic energy of the total effective mass at the payload. As the kinetic energy of a moving mass is equal to $\frac{1}{2} mv^2$, reducing the effective mass will reduce the collision force proportionally, or for a given collision force limit, allow the velocity to be increased by the square root of the effective mass reduction, in this example by a factor of 200%. This speed increase can allow a collaborative robot arranged like that in FIG. 2 to operate at 1-2 msec at the gripper or other end effector instead of 500 mm/sec, which permits the robot to work at speeds similar to or faster than a person. This allows much easier justification for the use of this class of robot as it enables safe speeds that match a person on an assembly line.

At least some embodiments further utilize a dynamic model of the robot for control that provides dynamic feedforward torques (also called feedforward torques herein) to gravity balance and assist in driving the motors of the robot. If robot could be perfectly modeled, the feedforward torques could move the robot's tool tip or other end effector along a specified trajectory without any real-time feedback and with no errors. In practice, dynamic models can be quite accurate, but are not perfect. Methods for generating a dynamic model are well known in the art and include empirical as well as mathematical procedures. One such method is described in "Robot Manipulators: Mathematics, Programming, and Control" by Richard P. Paul, 1981, wherein a symbolic model is developed using Lagrangian mechanics. However, in the past, the application of such dynamic models was typically to improve the performance of the robot, such as reducing position tracking errors or achieving greater dynamic stability. In at least some aspects of the invention, a dynamic model of a robot and dynamic feedforward torques are employed, e.g., at all times and all operation modes, to effectively reduce the impact force if a robot collides with a person.

In the illustrative embodiment of FIG. 2, a robot 1 includes a vertical support 102 that is supported by a base 100. The base 100 may be fixed to ground, a floor or other structure, and may be considered stationary in at least some applications. A vertical support 102 is attached to the base 100, and supports an arm assembly 103 that includes a first arm link 104, a second arm link 110 and a third link 114, which may all be cantilevered from the vertical support 102. The arm assembly 103 may be movable relative to the vertical support 102 along a vertical axis 2, and may be moved by an arm assembly drive 106. In this embodiment, the vertical support 102 is depicted as a column or having a cylindrical or rectangular cross section, but the vertical support 102 could have any shape that allows the arm assembly 103 to achieve the desired range of motion along the vertical axis 2. To guide the arm assembly 103 in its motion along the vertical axis 2, the vertical support 102 can include linear and/or rotary bearings, slideways, tracks or another structure to support the arm assembly 103 while providing relatively low friction movement. In this embodiment, the arm assembly drive 106 includes a rotary motor that drives a timing belt 107, chain, cable or other structure to move the arm assembly 103 along the vertical axis, but other drive arrangements could be used instead, such as a linear motor, rack and pinion, ball screw drive, etc. As mentioned above, the weight of the arm assembly 103 could be countered by a moving mass, spring or other element, e.g., to reduce the output force needed for the arm assembly drive 106 to move the arm assembly 103. As an example, the arm assembly 103 could be coupled to a cable that extends over a pulley (e.g., located near the top of the vertical support 102) and to a mass that counters the weight of the arm assembly 103.

In this embodiment, the first arm link 104 is rotatable relative to the base 100 about a first rotary axis 3 that is oriented in a vertical direction. Although other arrangements are possible and are discussed more below, in this embodiment the first arm link 104 is fixed relative to the vertical support 102 with respect to rotational movement about the first axis 3, and is rotated about the first axis 3 by a first link drive 108 that rotates both the vertical support 102 and the first arm link 104 relative to the base 100. A proximal end of the first arm link 104 is attached to the vertical support 102 and extends away from the vertical support 102 to a distal end of the first arm link 104, which is pivotally attached to the second arm link 110. The vertical support 102 may be rotatably supported on the base 100 in any suitable way, such as by a journal bearing, roller bearing, needle bearing, etc. and the first link drive 108 may include any suitable components to move the first arm link 104, such as a rotary motor that directly drives the vertical support 102 or employs a transmission or other drive train.

A proximal end of the second arm link 110 is coupled to the distal end of first arm link 104, and is rotatable relative to the first arm link 104 about a second rotary axis 4 that is spaced from the first axis 3, and is oriented in the vertical direction. Thus, both the first and second arm links 104, 110 are movable in a horizontal plane. The second arm link's 110 rotation is driven by a second link drive 112, which in this embodiment includes a drive motor located within or otherwise attached to the first arm link 104 near the vertical support 102. The motor of the second link drive 112 may be coupled to the second arm link 110 via a drive belt 111, chain, cable, axle or other transmission element, and may be located proximal to the vertical support 102 inside the first arm link 104. This arrangement may reduce a mass of the arm assembly 103 at or near the second axis 4, and therefore the inertia of the arm assembly 103. In other embodiments, second link drive 112 could instead include a motor that is located co-axially with the second arm link 110's rotational axis, i.e., the second axis 4. For example, a motor of the second link drive 112 could be directly coupled to the second arm link 110 at the joint between the first and second arm links 104, 110 and have a rotor that rotates about the second axis 4. Other arrangements are possible, including having the drive motor mounted to the second arm link 110, but having the motor positioned away from the second axis 4.

Figure 7:
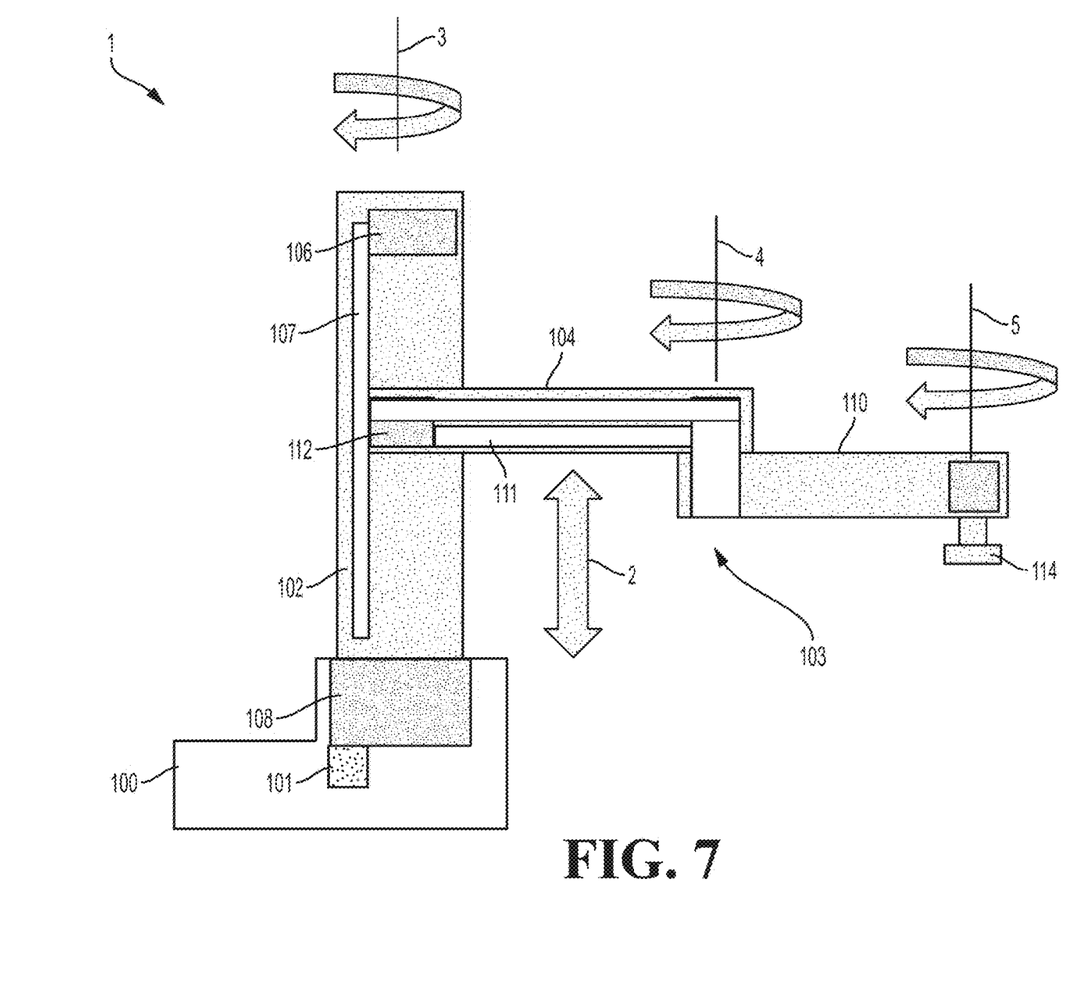
FIG. 7 shows a 4-axis embodiment with 1:1 drive ratios for three rotary axes.

A third link 114 is coupled to the distal end of the second arm link 110, and is rotatable relative to the second arm link 110 about a third rotary axis 5. Depending on the embodiment, a 1, 2, or 3-axis version of third link 114 can be attached to the end of the second arm link 110. For a 6-axis version of the robot 1, a 3-axis version of the third link 114 may be employed as in FIG. 2. In this embodiment, the third link 114 can rotate about the third axis 5, which is aligned along the length of the second arm link 110 or is parallel to a longitudinal axis of the second arm link 110. Also, the third link 114 may include a component, such as a gripper or other end effector, that is rotatable relative to the third link 114 about a fourth rotary axis 6 that in this embodiment is oriented perpendicular to the third axis 5. The component of the third link 114 may also be rotatable about a fifth rotary axis 7, that in this embodiment is oriented in a direction that is perpendicular to the fourth axis 6. In some embodiments, the third, fourth and fifth axes 5, 6, 7 may intersect at a common point. The depicted configuration for the third link 114 is a "Yaw-Pitch-Roll" configuration, in which the Yaw, or third axis 5 allows for rotation about the longitudinal axis of the second arm link 110, the Pitch, or fourth axis 6, allows for rotation about an axis perpendicular to the third axis 5, and the Roll, or fifth axis 7, allows for rotation about an axis perpendicular to the fourth axis 6. Embodiments are not limited to this third link 114 configuration; an alternative is described with a different embodiment below. The overall configuration results in a robot that can articulate in six separate axes. For a 5-axis configuration, the rotary axis about third axis 5 is typically eliminated. For a 4-axis configuration, the rotary axes about both third and fourth axes 5 and 6 are typically eliminated. For example, FIG. 7 shows a robot 1 that is identical to that in FIG. 2, except that the third link 114 is rotatable only about a third rotary axis 5 that is arranged in the vertical direction. Although other combinations of axis reductions are possible as well.

In accordance with an aspect of the invention, each of the arm assembly drive 106, the first link drive 108 and the second link drive 112 include a motor and drive train that have a low drive ratio, i.e., of 25:1 or less. In some cases, the drive train may be very simple, and include a direct connection of a motor rotor to a corresponding link or other driven part of the robot. In other cases, the drive train may include any suitable components, such as belt/chain/cable drives, pulleys, drive axles, bearings, drive gears of any suitable type, etc. The use of low drive ratio drive trains for the "first" three, or major, axes of movement of the robot 1 may provide for relatively high-speed robot movement while complying with collaborative robot regulations and other criteria. Also, the robot 1 may be back-drivable at the joints or movement axes having a low drive ratio, e.g., a person may be able to pivot or otherwise move arm links or other robot components by pushing on the components appropriately with low to moderate force, allowing easy teaching of positions by moving the robot by hand. This backdrive capability is simply not present in robots employing high ratio drive transmissions, such as harmonic transmissions and other similar elements. In some cases, a low drive ratio of less than 10:1 may be preferable, and may provide advantages over even drive ratios between 10:1 and 25:1.

The robot 1 also includes a controller 101 that provides control signals to the arm assembly drive 106, the first link drive 108, and the second link drive 112 to move the arm assembly 103 and its component parts. Optionally, the controller 101 may provide control signals to control movement of the third link 114 and components of the third link 114, e.g., by providing control signals to one or more motors that drive movement of the third link 114 and its components. In this embodiment, the controller 101 is pictured mounted in the base 101 to further minimize the moving mass of the robot. However, the controller 101 can be mounted externally to the robot or mounted in the links of the robot or distributed throughout the robot without impacting the benefits of this invention. As discussed above, and in more detail below, the controller 101 may determine drive control signals for at least the arm assembly drive 106, the first link drive 108, and the second link drive 112 using a model of the robot 1 that determines dynamic feedforward motor torques, and uses those torques to determine appropriate control signals for the drives 106, 108, 112. This may allow for the use of relatively low feedback error motor torques by the controller 101, e.g., that are limited to 10-25% of a maximum motor torque.

Figure 3:
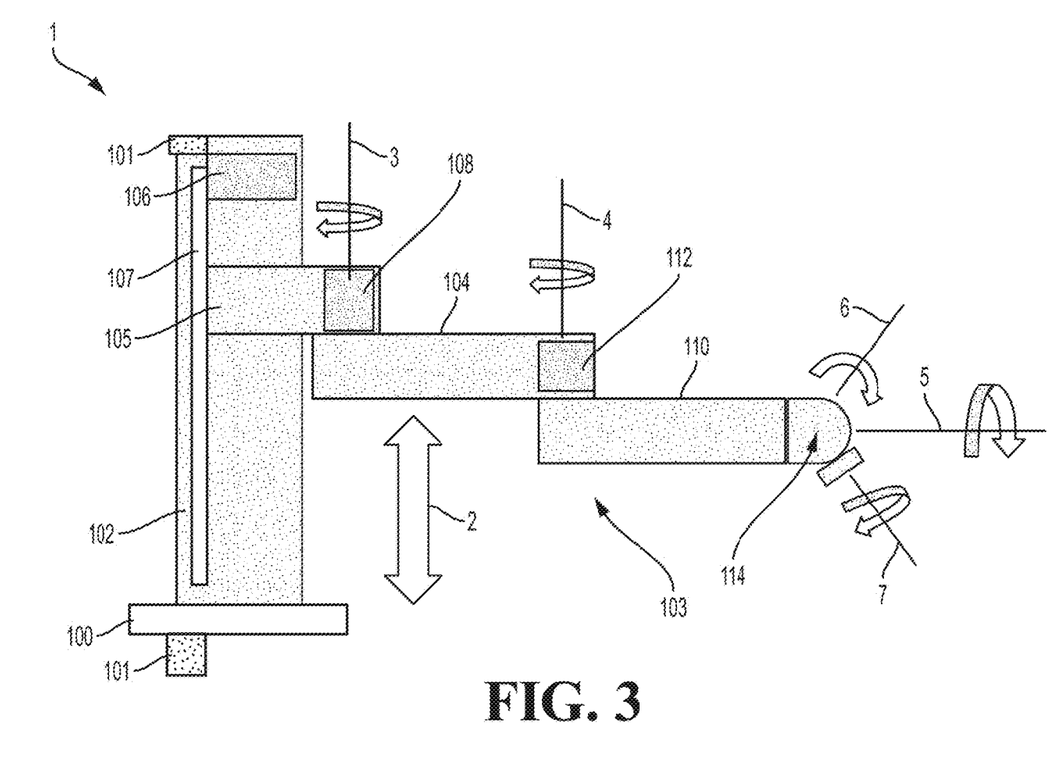
FIG. 3 shows another embodiment of the horizontally articulated 6-axis robot having a first arm link pivotally coupled to a carriage on a vertical support.

FIG. 3 shows another embodiment of a robot 1 that is similar to the robot of FIG. 2. Thus, elements in common between FIGS. 2 and 3 are not described again, and instead only variations in relation to FIG. 2 are discussed. In this embodiment, the vertical support 102 is fixed to the base 100 and does not rotate. Although it is possible the vertical support 102 could move, e.g., in a horizontal direction relative to the base 100, it does not do so in this embodiment. In this embodiment, the arm assembly 103 includes a carriage 105 that is arranged for movement along the vertical axis 2 and is driven by the arm assembly drive 106. The first arm link 104 is pivotally connected to the carriage 105, and is driven by the first link drive 108 to move about the first axis 3 relative to the carriage 105, and thus relative to the base 100. In this embodiment, the first link drive 108 is arranged on the carriage 105, and may include a motor that is co-axial with the first axis 3 or otherwise located. As in the FIG. 2 embodiment, the second arm link 110 is pivotally attached to the first arm link 104, and is driven to move about the second axis 4 by the second link drive 112. However, in contrast to the FIG. 2 embodiment, the second link drive 112 is located on the first arm link 104, e.g., at or near the second axis 4. Like the first link drive 108, the second link drive 112 may include a motor that is co-axial with the second axis 4, e.g., have a rotor that rotates about an axis that is co-axial with the second axis 4, or may be arranged in another way. A 1, 2, or 3-axis third link 114 may be attached to the second arm link 110 as described previously.

Figure 4:
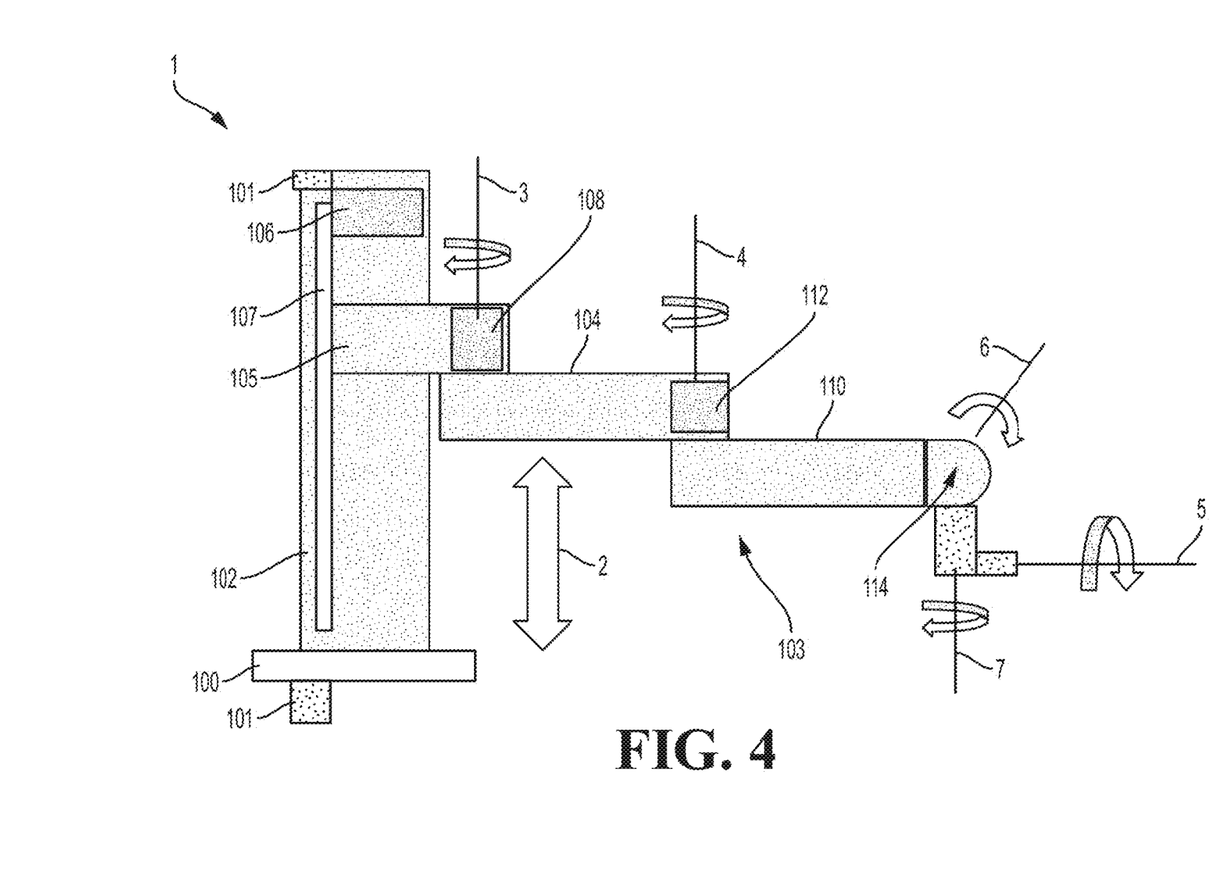
FIG. 4 shows yet another embodiment of the horizontally articulated 6-axis robot having a revised third link.

FIG. 4 shows another embodiment of a robot 1, with a similar arrangement to that of the FIG. 3 embodiment. As above, elements in common with FIGS. 2 and 3 are not described again, and instead only variations in relation to FIG. 2 or 3 are discussed. In this embodiment, the third link 114 has a different configuration, but is again capable of rotating in up to three axes. The third link 114 here comprises a "pitch" section that rotates about a third axis 6 that is horizontal and perpendicular to the longitudinal axis of the second arm link 110, a "yaw" section that rotates about a fourth axis 7 that is perpendicular to the third axis 6, and a "roll" section extending outwards from the "yaw" section that can rotate in about a fifth axis 7 and is perpendicular to the "yaw" axis (the fourth axis 7). In this embodiment, the third axis 6 intersects with the fourth axis 7 and the fourth axis 7 also intersects with the fifth axis 5 but at a different point.

As described previously, the configuration of the major axes of motion (the vertical axis, and the first and second rotary axes—2, 3, 4) with the rotations of the first and second arm links in horizontal planes greatly reduce the moment load from gravity on the motors for the first link drive and the second link drive. This makes it possible for low-ratio drives, including direct drive arrangements, to be used in place of higher ratio systems. The low-ratio drive arrangements result in drives that are back-driveable in some embodiments of the robot. The use of low-ratio drive arrangements for the major axes dramatically reduces the forward reflected inertia and thus the effective mass at the gripper/tool tip/other end effector. For example, if the inertia for a 250 Nm direct-drive motor arrangement is 0.014 kgm2 at a one meter radius, with a drive ratio of 1:1, the reflected inertia from the motor has an effective mass of only 14 grams, which is trivial when compared to, for example, a 3 kg payload. In this example, almost all of the kinetic energy will be coming from the payload and the robot structure, not the reflected motor inertia.

In some embodiments, the robot further reduces the impact forces during a potential collision by having the robot controller 101 implement an algorithm designed to limit motor torque during collisions by determining dynamic feedforward torques for at least the major axes (or "first" three axes in the embodiments above of the vertical axis, and the first and second rotary axes) and distinguishing these from the PID feedback error torques to arrive at a final command set or control signal for the relevant drives.

Figure 5:
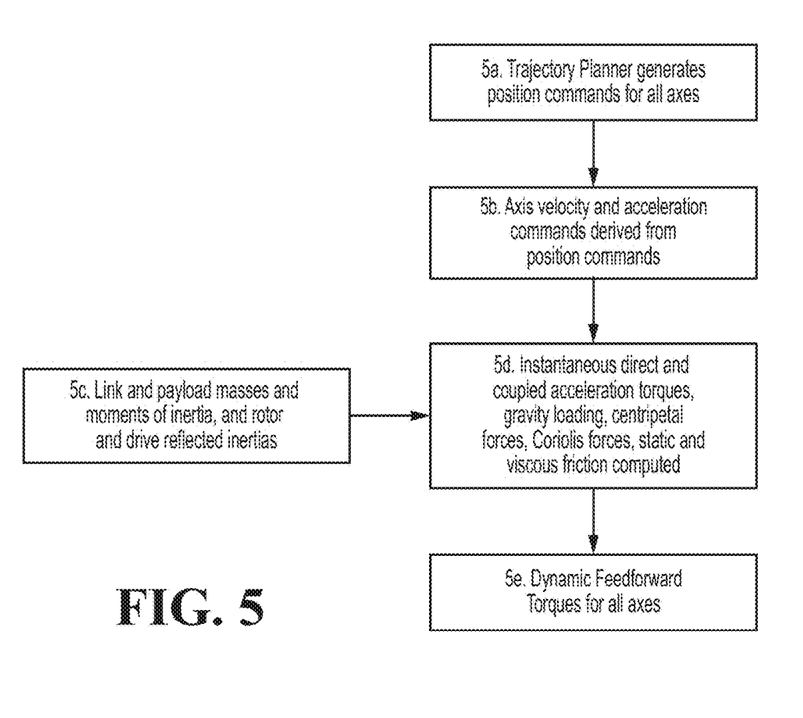
FIG. 5 shows a block diagram of the major elements of a system for determining dynamic feedforward torque control signals.

FIG. 5 shows a block diagram that describes how the control circuitry of the controller 101 may determine the dynamic feedforward torques. Each of the components shown in FIG. 5 may be implemented by a suitably programmed computer or other data processor, and may be employed in the form of software modules, ASICs, programmable arrays, or any other suitable arrangement. A trajectory planner 5a generates position commands for each axis in real time based on where the robot should be at that moment. That is, the trajectory planner 5a, knowing where the third link 114 or other end effector should be located, determines the positions of the arm assembly 103, the first arm link 104 and the second arm link 110 so that the third link 114 can be properly positioned. In some cases, the "positions for each axis," i.e., the vertical axis 2, the first axis 3 and the second axis 4, may be the position of the arm assembly 103 relative to the vertical support 102, the position of the first arm link 104 relative to the base 100, and the position of the second arm link 110 relative to the first arm link 104. A variety of well-known techniques can be employed to determine this position information, and are not described in detail.

A velocity and acceleration manager 5b uses these position commands to determine the corresponding axis velocity and acceleration commands to achieve the desired position. Again, "axis velocity and acceleration commands" may be the required velocity and acceleration targets for movement of each of the arm assembly 103 relative to the vertical support 102, the first arm link 104 relative to the base 100, and the second arm link 110 relative to the first arm link 104. For pivotal movement, velocity and acceleration may be angular velocity and acceleration, e.g., for the first and second arm links 104, 110. Again, well-known techniques can be used to determine velocity and acceleration control signals for the arm assembly drive 106, the first link drive 108 and the second link drive 112, and are not described in detail herein. Additionally, for the purposes of this invention, the functions of 5a and 5b need not be separated and can be computed at once by the Trajectory Planner 5a if desired.

The position, velocity and acceleration control signals are then combined with the reflected inertia and effective mass modeler 5c information that includes the known link and payload masses for the robot 1, along with the known motor and drive train forward reflected inertias. In one embodiment, this combination process utilizes one or more higher order equations that provide a dynamic model of the robot 1 that accounts for target positions, velocities and acceleration for all of the major axes of motion, as well as the reflected inertia of the drive train and driven components.

Next, a feedforward torque manager 5d combines the position, velocity and acceleration control signals with the dynamic parameters of the robot generated by the reflected inertia and effective mass modeler 5c to determine motor torques for all of the arm assembly drive 106, the first link drive 108 and the second link drive 112. These torques are determined in real time, and can include but are not limited to: the effects of the acceleration of each axis including the direct effect on the axis being accelerated, coupled effects that axes have on other axes, centripetal effects, and gravity loading; Coriolis forces; and static and viscous friction. The inertias considered in the torque calculations include the mass of each link, the mass of the payload, and the forward reflected inertia of the motor rotors and the motor drives and their associated moments of inertia. In one embodiment, the combination process makes use of one or more higher order equations that encapsulates the dynamic model of the robot. In other embodiments, the dynamic model of the robot used by the feedforward torque manager 5d can be implemented by other means including table look up methods and state-space approaches that may at times combine the operations of the reflected inertia and effective mass modeler 5c with the operation of the feedforward torque manager 5d into a single function. The control output manager 5e may use the motor torques to determine motor control signals that are provided by the controller 101. As discussed above, the controller 101 may combine motor torques generated using the feedforward dynamic modeling with feedback torques that are separately determined, e.g., using conventional feedback control techniques. Additionally, while one embodiment generates the feedforward torques for the primary axes (the arm assembly drive 106, the first link drive 108 and the second link drive 112) since they provide the most benefit for a collaborative robot, these same methods can be extended to all axes of the robot if desired.

Figure 6:
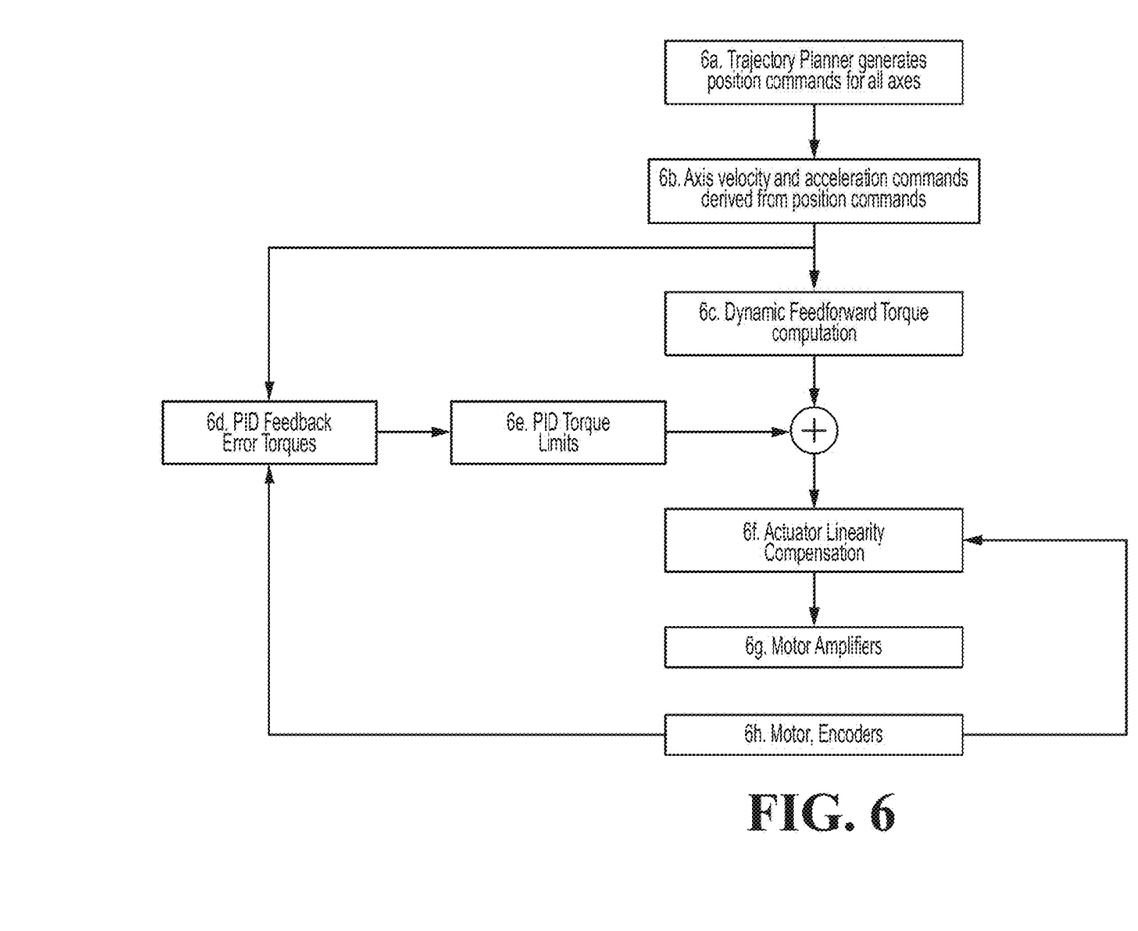
FIG. 6 shows steps in a control method for a robot arranged as in FIG. 2.

FIG. 6 shows a block diagram describing the controller 101 operations with respect to determining motor control signals. In step 6a, the Trajectory Planner 5a generates the position commands for each axis at a regular rate, such as every few milliseconds. In step 6b, the position commands are used by the velocity and acceleration manager 5b to determine the corresponding axis velocity and acceleration commands. As previously stated, the operations of steps 6a and 6b can be combined if desired and will yield the same functional design. In step 6c, the velocity and acceleration commands are provided for use in the dynamic feedforward torque computation by the reflected inertia and effective mass modeler 5c and the feedforward torque manager 5d. In addition, the velocity and acceleration commands are provided to a PID feedback error torque manager at step 6d. The PID feedback error torque manager is also provided with the actual instantaneous axis positions in step 6h, e.g., by reading encoders or other position indicators for each of the axes. The PID feedback error torque manager compares these position values to the commands to generate correction feedback torques for each motor, and provides these correction feedback torques in step 6e to a PID torque limiter, which may limit the correction feedback torques to 10% to 25% of maximum motor torque. This serves to prevent excessive torque delivery in the event of a collision, which tends to produce excessive error signals.

The limited PID feedback torques and the dynamic feedforward torques are then summed to produce the desired commanded motor torques. However, in some motors, especially direct-drive motors, there can be significant non-linearities between the commanded torque and the actual torque produced by the motor due to errors in the shapes of the motor magnets. To correct for this, an actuator linear compensation manager in step 6f may adjust the commanded motor torques, e.g., to compensate the torque command based upon a motor's position and speed before the commanded torques are sent to the motor amplifiers in step 6g.

In some embodiments, the mechanical system employs either direct-drive or low ratio drives, allowing the accuracy of the dynamic feedforward torques to exceed 90% when predicting the torques necessary to drive the complete range of robot motions. Consequently, the output of the PID feedback error torque manager in step 6e is expected to be quite low, and thus can be limited to a small fraction of total power of the motors without affecting normal operations. This limit further contributes to the reduction of the impact forces during a collision and permits the safe operating speed of this invention to be increased. This allows the robot to comply with ISO_TS 15066 2016 regulations while operating at higher speeds than common in the current art. In addition, the controller 101 can monitor the limiting function and use the information to reliably and quickly determine if a collision has occurred. A collision will be directly indicated by the limit function if the limit is ever reached or if the limit is reached for a period of time. Additionally, by limiting the PID feedback error torques, whose job it is to correct for deviations in the motion of the robot, when a collision occurs, the limits will reduce the controller's ability to correct for errors during the collision and secondary indirect error conditions such as excessive tracking errors will be triggered more quickly.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The invention claimed is:

1. A robot comprising:
a base,
a vertical support extending from the base along a vertical linear axis,
an arm assembly supported by the vertical support and moveable relative to the vertical support along the vertical linear axis,
an arm assembly drive arranged to move the arm assembly relative to the vertical support, the arm assembly drive including a motor and drive train arranged to move the arm assembly and having a drive ratio of less than 25:1,
the arm assembly further comprising:
a first arm link coupled to the vertical support and arranged to rotate relative to the base about a first rotary axis that is oriented in a vertical direction,
a first link drive including a motor and drive train arranged to rotate the first arm link relative to the base about the first rotary axis and having a drive ratio of less than 25:1,
a second arm link coupled to the first arm link and arranged to rotate relative to the first arm link about a second rotary axis that is oriented in the vertical direction, the second rotary axis being spaced from the first rotary axis,
a second link drive including a motor and drive train arranged to rotate the second arm link relative to the first arm link about the second rotary axis, and
a controller constructed and arranged to provide control signals to the arm assembly drive and to the first and second link drives to move the arm assembly, the first arm link and the second arm link.

2. The robot of claim 1, wherein the control signals provided by the controller to the arm assembly drive and to the first and second link drives include a linearization compensation to compensate for non-linearities a motor and drive train of a corresponding drive.

3. The robot of claim 1, wherein the vertical support is arranged to pivot relative to the base about the first rotary axis, and the first link drive is arranged to pivot the vertical support relative to the base about the first rotary axis, and thereby rotate the first link relative to the base about the first rotary axis.

4. The robot of claim 1, wherein the arm assembly includes a carriage that is attached to the vertical support and is arranged to move relative to the vertical support along the vertical linear axis, wherein the arm assembly drive is arranged to move the carriage relative to the vertical support along the vertical linear axis, wherein the first arm link is pivotally attached to the carriage and arranged to pivot relative to the carriage about the first rotary axis, and wherein the first link drive is arranged to rotate the first arm link relative to the carriage about the first rotary axis.

5. The robot of claim 1, wherein the first arm link has a proximal end attached to the vertical support and a distal end attached to the second arm link, and the second arm link has a proximal end attached to the distal end of the first arm link and a distal end.

6. The robot of claim 1, wherein the first and/or second link drives include belt drives between the motor and the first and second arm links, respectively.

7. The robot of claim 1, wherein the first and second link drives have a drive ratio of 1:1.

8. The robot of claim 1, wherein the second link drive is in or near the vertical support, and drives the second arm link via a belt.

9. The robot of claim 1, wherein the first link drive is located coaxially with the first rotary axis, or the second link drive is located coaxially with the second rotary axis.

10. A robot comprising:
a base,
a vertical support extending from the base along a vertical linear axis,
an arm assembly supported by the vertical support and moveable relative to the vertical support along the vertical linear axis,
an arm assembly drive arranged to move the arm assembly relative to the vertical support, the arm assembly drive including a motor and drive train arranged to move the arm assembly,
the arm assembly further comprising:
a first arm link coupled to the vertical support and arranged to rotate relative to the base about a first rotary axis that is oriented in a vertical direction,
a first link drive including a motor and drive train arranged to rotate the first arm link relative to the base about the first rotary axis,
a second arm link coupled to the first arm link and arranged to rotate relative to the first arm link about a second rotary axis that is oriented in the vertical direction, the second rotary axis being spaced from the first rotary axis,
a second link drive including a motor and drive train arranged to rotate the second arm link relative to the first arm link about the second rotary axis, and
a controller constructed and arranged to provide control signals to the arm assembly drive and to the first and second link drives to move the arm assembly, the first arm link and the second arm link, wherein the control signals provided by the controller include feedforward torque components determined in real time using a dynamic model of the robot and that include at least one of acceleration, gravity, velocity and friction compensation torque components to drive at least the arm assembly, the first arm link and the second arm link, the control signals provided by the controller further including a feedback torque components and the controller comprising a control circuit that limits the feedback torque component of a control signal for the arm assembly drive or for the first and second link drives to less than 25% of a maximum motor torque for the respective drive.

11. The robot of claim 10, wherein the controller is arranged to detect a collision of the robot with an object based on a magnitude of a feedback torque determined for at least one of the arm assembly drive and to the first and second link drives.

12. The robot of claim 10, wherein the controller is arranged to detect a collision of the robot with an object if a magnitude of a feedback torque for at least one of the arm assembly drive and to the first and second link drives reaches the control circuit limit for the feedback torque component for a specified period of time.

13. The robot of claim 10, wherein the control signals provided by the controller to the arm assembly drive and to the first and second link drives include a linearization compensation to compensate for non-linearities of a motor and drive train of a corresponding drive.

14. The robot of claim 10, wherein the vertical support is arranged to pivot relative to the base about the first rotary axis, and the first link drive is arranged to pivot the vertical support relative to the base about the first rotary axis, and thereby rotate the first link relative to the base about the first rotary axis.

15. The robot of claim 10, wherein the arm assembly includes a carriage that is attached to the vertical support and is arranged to move relative to the vertical support along the vertical linear axis, wherein the arm assembly drive is arranged to move the carriage relative to the vertical support along the vertical linear axis, wherein the first arm link is pivotally attached to the carriage and arranged to pivot relative to the carriage about the first rotary axis, and wherein the first link drive is arranged to rotate the first arm link relative to the carriage about the first rotary axis.

16. The robot of claim 10, wherein the first arm link has a proximal end attached to the vertical support and a distal end attached to the second arm link, and the second arm link has a proximal end attached to the distal end of the first arm link.

17. The robot of claim 10, wherein the first and/or second link drives include belt drives between the motor and the first and second arm links, respectively.

18. The robot of claim 10, wherein the first and second link drives have a drive ratio of 1:1.

19. The robot of claim 10, wherein the second link drive is in or near the vertical support, and drives the second arm link via a belt.

20. The robot of claim 10, wherein the first link drive is located coaxially with the first rotary axis, or the second link drive is located coaxially with the second rotary axis.

* * * * *